United States Patent
Sangapu et al.

(10) Patent No.: US 7,805,633 B2
(45) Date of Patent: Sep. 28, 2010

(54) OPTIMIZED RECONSTRUCTION AND COPYBACK METHODOLOGY FOR A DISCONNECTED DRIVE IN THE PRESENCE OF A GLOBAL HOT SPARE DISK

(75) Inventors: Satish Sangapu, Wichita, KS (US); Kevin Kidney, Lafayette, CO (US); William Hetrick, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 196 days.

(21) Appl. No.: 11/522,777

(22) Filed: Sep. 18, 2006

(65) Prior Publication Data

US 2008/0126838 A1    May 29, 2008

(51) Int. Cl.
    *G06F 11/00* (2006.01)
(52) U.S. Cl. .............................. 714/7; 714/6
(58) Field of Classification Search .................. None
    See application file for complete search history.

(56) References Cited

U.S. PATENT DOCUMENTS

| | | | | |
|---|---|---|---|---|
| 5,210,866 A * | 5/1993 | Milligan et al. | ................. | 714/6 |
| 5,357,509 A * | 10/1994 | Ohizumi | ......................... | 714/7 |
| 5,371,882 A * | 12/1994 | Ludlam | .......................... | 714/7 |
| 5,941,994 A * | 8/1999 | DeKoning et al. | .............. | 714/7 |
| 6,178,520 B1 * | 1/2001 | DeKoning et al. | .............. | 714/5 |
| 6,397,347 B1 * | 5/2002 | Masuyama et al. | .............. | 714/5 |
| 6,789,165 B2 * | 9/2004 | Apperley et al. | ............. | 711/114 |
| 6,836,820 B1 * | 12/2004 | Viswanathan et al. | ........ | 711/114 |
| 6,880,101 B2 * | 4/2005 | Golasky et al. | ................. | 714/4 |
| 2002/0156987 A1 * | 10/2002 | Gajjar et al. | ................. | 711/203 |
| 2003/0217305 A1 * | 11/2003 | Krehbiel et al. | ................ | 714/6 |
| 2004/0250017 A1 * | 12/2004 | Patterson et al. | ............ | 711/114 |
| 2005/0283654 A1 * | 12/2005 | Wood et al. | ..................... | 714/7 |
| 2007/0088990 A1 * | 4/2007 | Schmitz | ....................... | 714/700 |
| 2007/0220318 A1 * | 9/2007 | Kalos et al. | .................... | 714/13 |

OTHER PUBLICATIONS

David A. Patterson, Et Al., A Case for Redundant Arrays of Inexpensive Disks (RAID), 1988, pp. 109-116, Publisher: Association for Computing Machinery, Published in: US.

* cited by examiner

*Primary Examiner*—Gabriel L Chu
(74) *Attorney, Agent, or Firm*—Suiter Swantz pc llo

(57) ABSTRACT

The present invention is a system for optimizing the reconstruction and copyback of data contained on a failed disk in a multi-disk mass storage system.

A system in accordance with the present invention may comprise the following: a processing unit requiring mass-storage; one or more disks configured as a RAID system; an associated global hot spare disk; and interconnections linking the processing unit, the RAID and the global hot spare disk.

In a further aspect of the present invention, a method for the reconstruction and copyback of a disconnected RAID disk utilizing a global hot spare disk is disclosed. The method includes: disconnecting a RAID component disk; reconstructing data from the disconnected RAID disk onto a global hot spare disk; reconnecting the disconnected RAID component disk; and copying the reconstructed data from the global hot spare disk back to the reconnected RAID component disk.

9 Claims, 6 Drawing Sheets

OPTIMIZED RECONSTRUCTION AND COPYBACK METHODOLOGY FOR A DISCONNECTED DRIVE IN THE PRESENCE OF A GLOBAL HOT SPARE DISK

FIELD OF THE INVENTION

The present invention relates to the field of Redundant Arrays of Inexpensive Disks (RAID) storage systems and, more particularly, optimizing the reconstruction of a component drive following its disconnection.

BACKGROUND OF THE INVENTION

Redundant Arrays of Inexpensive Disks (RAID) have become effective tools for maintaining data within current computer system architectures. A RAID system utilizes an array of small, inexpensive hard disks capable of replicating or sharing data among the various drives. A detailed description of the different RAID levels is disclosed by Patterson, et al. in "A Case for Redundant Arrays of Inexpensive Disks (RAID)," ACM SIGMOD Conference, June 1988. This article is incorporated by reference herein.

Several different levels of RAID implementation exist. The simplest array, RAID level 1, comprises one or more disks for data storage and an equal number of additional "mirror" disks for storing a copy of all the information contained on the data disks. The remaining RAID levels 2, 3, 4, 5 and 6, all divide contiguous data into pieces for storage across the various disks.

RAID level 2, 3, 4, 5 or 6 systems distribute this data across the various disks in blocks. A block is composed of many consecutive sectors where a sector is a physical section of a disk drive including a collection of bytes. A sector is the disk drive's minimal unit of data transfer. When a data block is written to a disk, it is assigned a Disk Block Number (DBN). All RAID disks maintain the same DBN system so one block on each disk will have a given DBN. A collection of blocks on the various disks having the same DBN are collectively known as stripes.

Additionally, many of today's operating systems manage the allocation of space on mass storage devices by partitioning this space into volumes. The term volume refers to a logical grouping of physical storage space elements which are spread across multiple disks and associated disk drives, as in a RAID system. Volumes are part of an abstraction which permits a logical view of storage as opposed to a physical view of storage. As such, most operating systems see volumes as if they were independent disk drives. Volumes are created and maintained by Volume Management Software. A volume group is a collection of distinct volumes that comprise a common set of drives.

One of the major advantages of a RAID system is its ability to reconstruct data from a failed component disk from information contained on the remaining operational disks. In RAID levels 3, 4, 5, 6, redundancy is achieved by the use of parity blocks. The data contained in a parity block of a given stripe is the result of a calculation carried out each time a write occurs to a data block in that stripe. The following equation is commonly used to calculate the next state of a given parity block:

new parity block=(old data clock xor new data block) xor old parity block

The storage location of this parity block varies between RAID levels. RAID levels 3 and 4 utilize a specific disk dedicated solely to the storage of parity blocks. RAID levels 5 and 6 interleave the parity blocks across all of the various disks. RAID 6 distinguishes itself as having two parity blocks per stripe, thus accounting for the simultaneous disconnection of two disks. If a given disk in the array is disconnected, the data blocks and the associated parity block for a given stripe from the remaining disks can be combined to reconstruct the missing data.

One mechanism for dealing with the disconnection of a single disk in a RAID system is the integration of a global hot spare disk. A global hot spare disk is a disk or group of disks used to replace a disconnected primary disk in a RAID configuration. The equipment is powered on or considered "hot," but is not actively functioning in the system. When a disk in a RAID system is disconnected, the global hot spare disk integrates for the disconnected disk and reconstructs all the volume pieces of the missing disk using the data blocks and parity blocks from the remaining operational disks. Once this data is reconstructed the global hot spare disk functions as a component disk of the RAID system until reconnection of the disconnected RAID disk. When the disconnected primary disk is reconnected, a copyback of the reconstructed data from the global hot spare to the reconnected primary disk may occur.

Currently, when a component disk is disconnected in a non-RAID 0 system, the global hot spare disk integrates for the disconnected disk and reconstructs all volume pieces from the disconnected disk. This approach needlessly reconstructs and copies back volume pieces belonging to volumes which were not accessed or modified (i.e. those which did not receive an I/O request) in the time between the disconnection of the RAID component disk and its reconnection.

Therefore, it would be desirable to provide a system and a method for reconstruction and copyback of only those volume pieces on a disconnected disk which were part of the volumes receiving an I/O request in the time between the disconnection and reconnection of a RAID disk.

SUMMARY OF THE INVENTION

Accordingly, the present invention is directed to a system and a method for optimized reconstruction and copyback of the contents of a disconnected RAID disk utilizing a global hot spare disk.

In a first aspect of the invention, a system for the reconstruction and copyback of a failed RAID disk utilizing a global hot spare is disclosed. The system comprises the following: a processing unit requiring mass-storage; one or more disks configured as a RAID system; an associated global hot spare disk; and interconnections linking the processing unit, the RAID and the global hot spare disk.

In a further aspect of the present invention, a method for the reconstruction and copyback of a disconnected RAID disk utilizing a global hot spare disk is disclosed. The method includes: disconnecting a RAID component disk; reconstructing data from the disconnected RAID disk onto a global hot spare disk; reconnecting the disconnected RAID component disk; and copying the reconstructed data from the global hot spare disk back to the reconnected RAID component disk.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
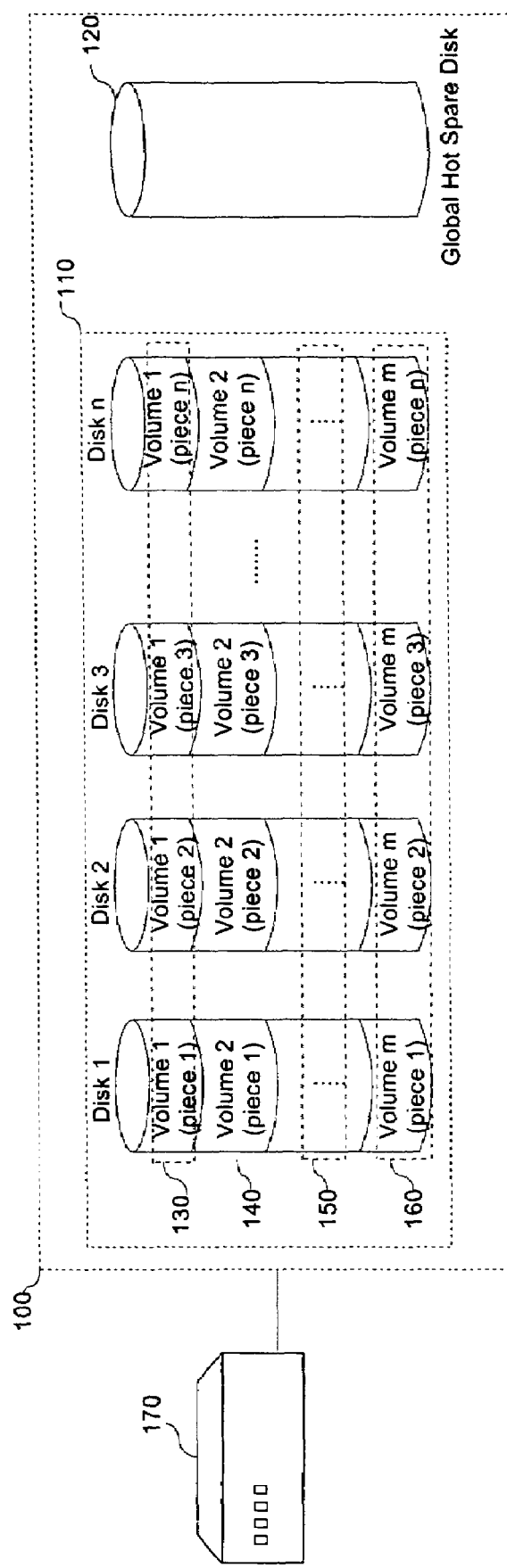
FIG. 1 is an illustrative representation of an n-disk RAID system and an additional standby global hot spare disk. A volume group comprising the n disks has m individual volumes, each volume being segmented into n pieces across the n disks.

Reference will now be made in detail to the presently preferred embodiments of the invention.

Should a component disk of the RAID become disconnected either accidentally or intentionally as for maintenance purposes, a global hot spare disk will incorporate for the missing drive. In order to maintain data consistency, when a processing unit makes I/O requests to one or more volumes in the RAID (i.e. the volumes become "degraded"), the system initiates a reconstruction of the pieces of those volumes which are contained on the disconnected drive. This reconstruction is achieved by use of the data and parity information maintained on the remaining operational disks. Following reconstruction of any degraded volumes, the global hot spare disk operates as a component drive in the RAID in place of the disconnected disk with respect to those degraded volumes. The non-degraded volumes are not reconstructed to the global hot spare disk as no change has been made to their contents (i.e. no I/O requests to those volumes have occurred.)

When the original disconnected disk is reinserted back into the RAID, a copyback of data from the global hot spare disk occurs. The volume pieces of those volumes which become degraded and are reconstructed to the global hot spare disk are copied back in place of the previous versions currently contained on the reconnected disk. However, the volume pieces from any non-degraded volumes contained on the disconnected disk remain unchanged from their state prior to the disconnection.

The reconstruction and copyback of only those volumes which become degraded while the disconnected disk is absent shortens the amount of time required for the reconstruction/copyback process as a whole (and thus any overall system down time). The unchanged optimal data of the non-degraded volumes remains in a consistent state with or without reconstruction and copyback. As such, a reconstruction and recopying of non-degraded volumes would unnecessarily lengthen the reconstruction/copyback process. If only one of ten logical volumes actually became degraded during a disk disconnection, the reconstruction of all volumes would result in an overall reconstruction/copyback time ten times longer than actually required to maintain data consistency.

This mechanism also reduces the amount of time that a global hot spare is dedicated to a given volume group. As a global hot spare can only be incorporated for one RAID component disk at a time, the simultaneous failure of multiple RAID disks can not be handled. As such, minimizing the amount of time that a global hot spare is used as a RAID component disk is desirable.

A system in accordance with the invention may be implemented by incorporation into the volume management software of a processing unit requiring mass-storage, as firmware in a controller for a RAID system, or as a stand alone hardware component which interfaces with a RAID system.

Additional details of the invention are provided in the examples illustrated in the accompanying drawings.

Referring to FIG. 1, an illustrative representation of a mass storage system 100 comprising an n-disk, non-RAID 0 system 110 and an additional standby global hot spare disk 120 is shown. A volume group comprises m individual volumes 130, 140, 150 and 160. Each volume 130, 140, 150 and 160 is comprised of n individual pieces, each corresponding one of the n disks of the n-disk RAID system. Volume management software of an external device capable of transmitting I/O requests 170 enables the device to treat each volume as being an independent disk drive. As such, the possibility exists that certain volumes 130, 140, 150 or 160 may not be accessed during the time period between disconnection of one of the n disks 110 and its reconnection.

Figure 2:
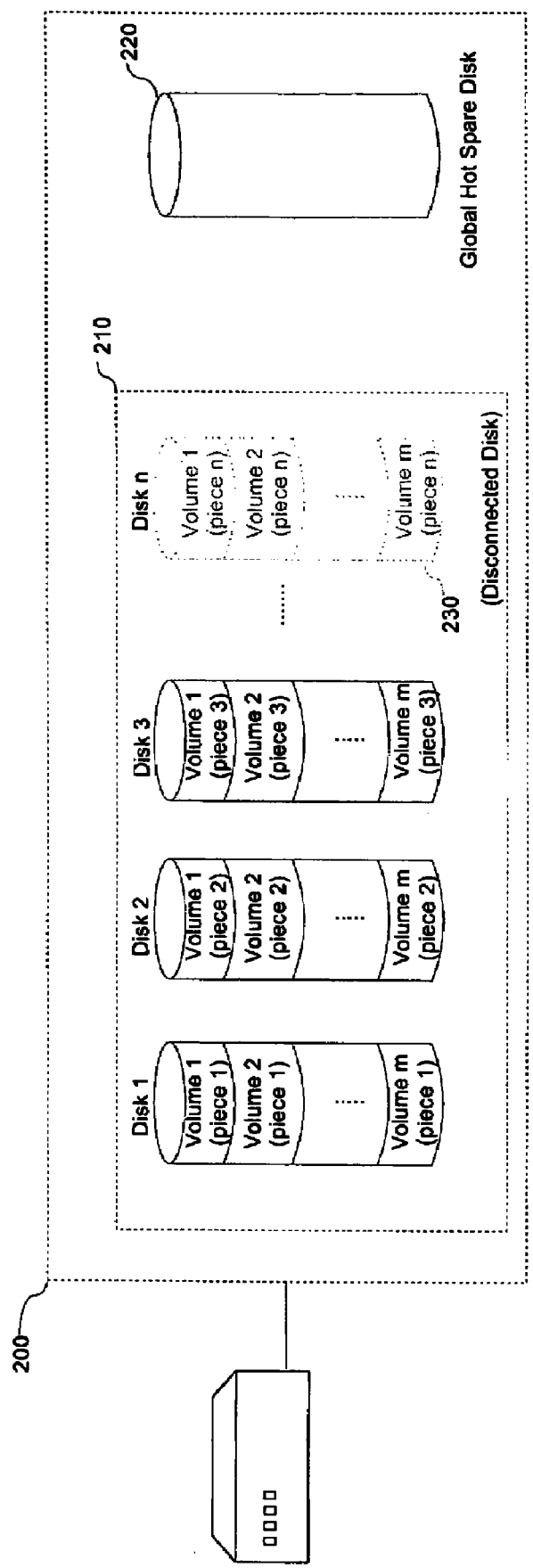
FIG. 2 is an illustrative representation of an n-disk RAID system and an additional standby global hot spare disk wherein one of the n disks has been disconnected.

Referring to FIG. 2, an illustrative representation of a mass storage system 200 comprising an n-disk RAID system 210 with an additional standby global hot spare disk 220 is shown, wherein one of the n disks 230 has become disconnected.

Figure 3:
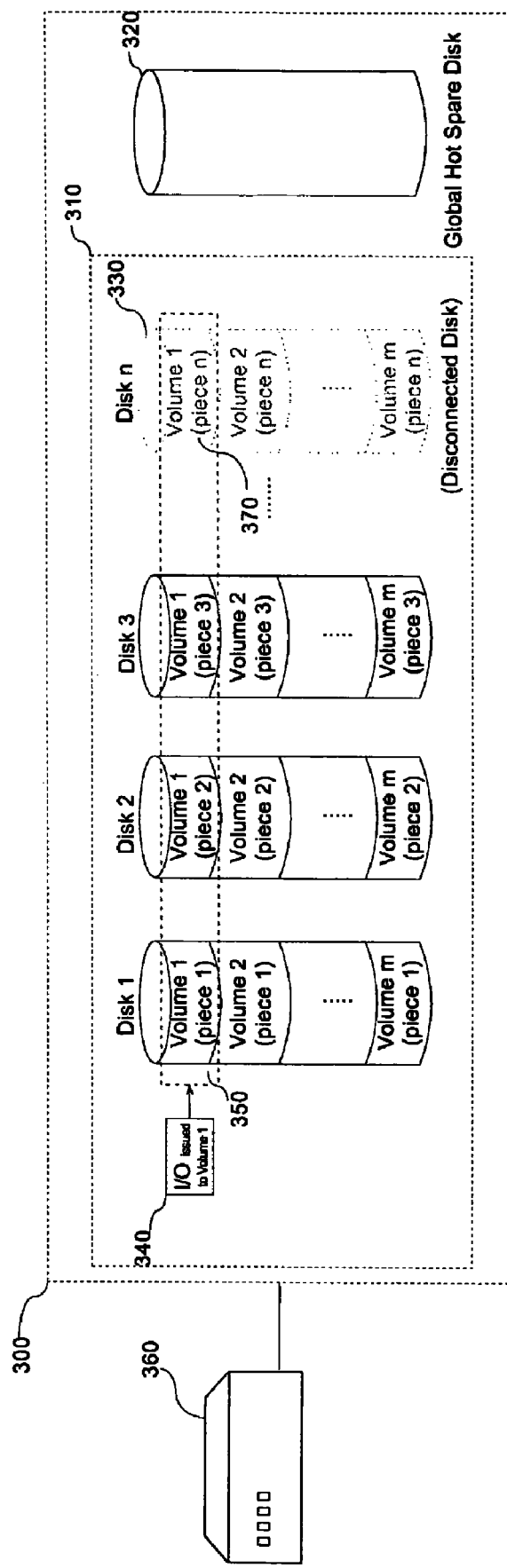
FIG. 3 is an illustrative representation of an I/O request having been issued to a given volume of the volume group causing that volume to transition from an optimal state into a degraded state.

Referring to FIG. 3, an illustrative representation of mass storage system 300 comprising an n-disk RAID system 310 with an additional standby global hot spare disk 320 is shown, wherein one of the n disks has become disconnected 330. An I/O request 340 is made to one or more of the volumes 350 by an external device 360. When this occurs, the volumes to which the requests were addressed 350 transition from an optimal state to a degraded state. This transition initiates the reconstruction of the degraded-state volume pieces 370 located on the disconnected disk 330 to the global hot spare disk 320.

Figure 4:
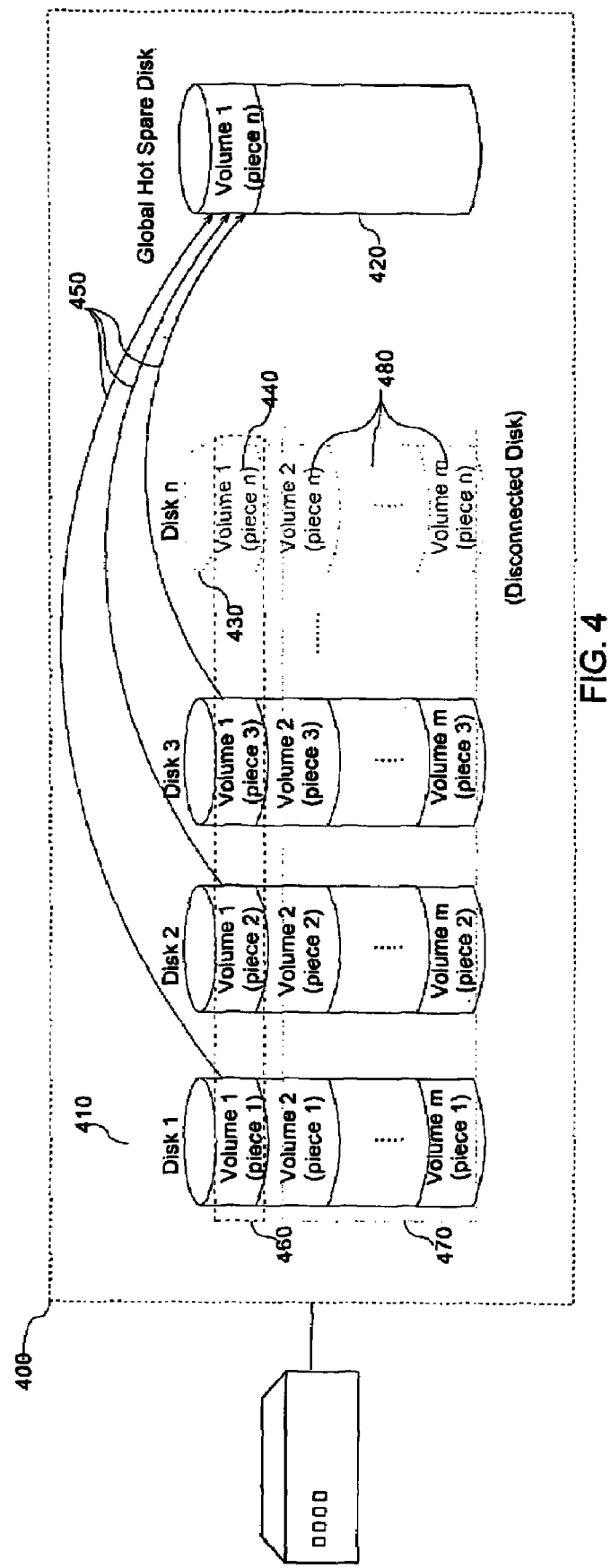
FIG. 4 is an illustrative representation of the integration of a global hot spare disk and the reconstruction of a volume piece of a degraded-state volume from a disconnected disk onto the global hot spare disk utilizing data and parity information from the volume pieces from the remaining n-1 operational disks still connected in the RAID.

Referring to FIG. 4, an illustrative representation of a mass storage system 400 comprising an n-disk RAID system 410 with an additional standby global hot spare disk 420 is shown, wherein one of the n disks 430 has become disconnected. The global hot spare disk 420 has been integrated as a component disk of the n-disk RAID system 410. The volume piece 440 of the degraded-state volume 460 located on the disconnected disk 430 is reconstructed onto the global hot spare disk 420 utilizing the existing data blocks and parity blocks 450 from the corresponding volumes pieces comprising the remainder of the degraded volume 460. The pieces 480 of the non-degraded volumes 470 on the disconnected disk 430 are not reconstructed to the global hot spare disk.

Figure 5:
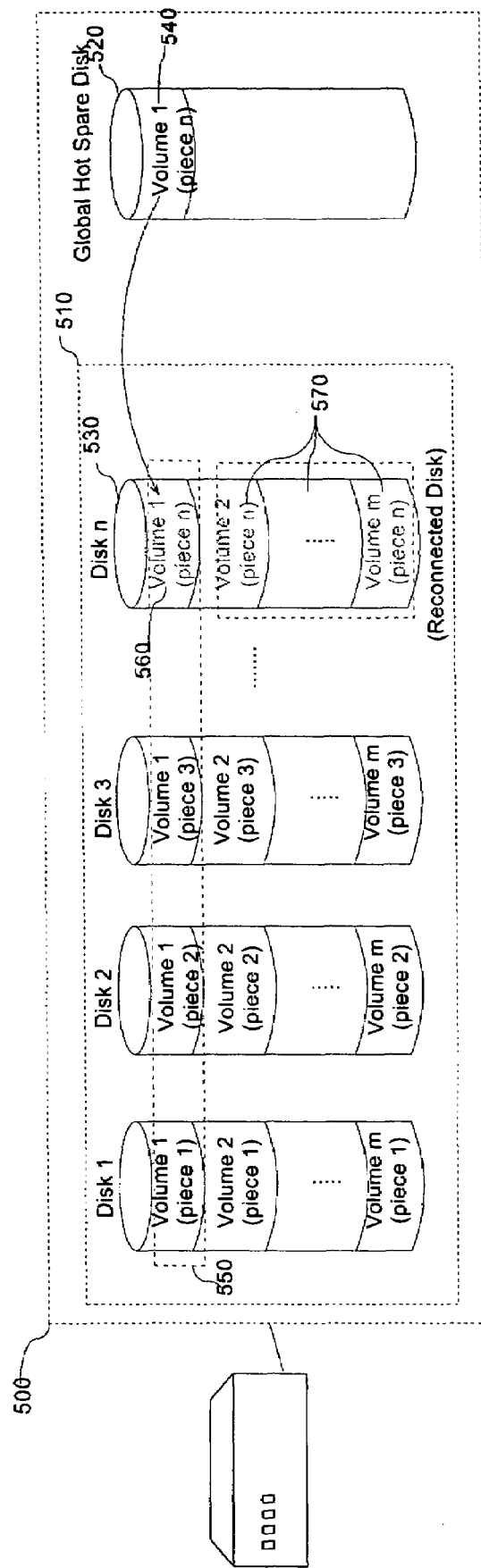
FIG. 5 is an illustrative representation of the copyback of a reconstructed volume piece from the global hot spare disk to a replacement disk for a failed disk.

Referring to FIG. 5, an illustrative representation of a mass storage system 500 comprising an n-disk RAID system 510 with an additional standby global hot spare disk 520 is shown, wherein a previously disconnected disk 530 has been reconnected. The reconstructed piece 540 of the degraded volume 550 is copied back from the global hot spare disk 520 to the corresponding volume piece 560 of the reconnected RAID disk 530. Following copyback, the reconnected RAID disk 530 contains the reconstructed data of the degraded volume piece 560 and the original data of the non-degraded volume pieces 570.

Figure 6:
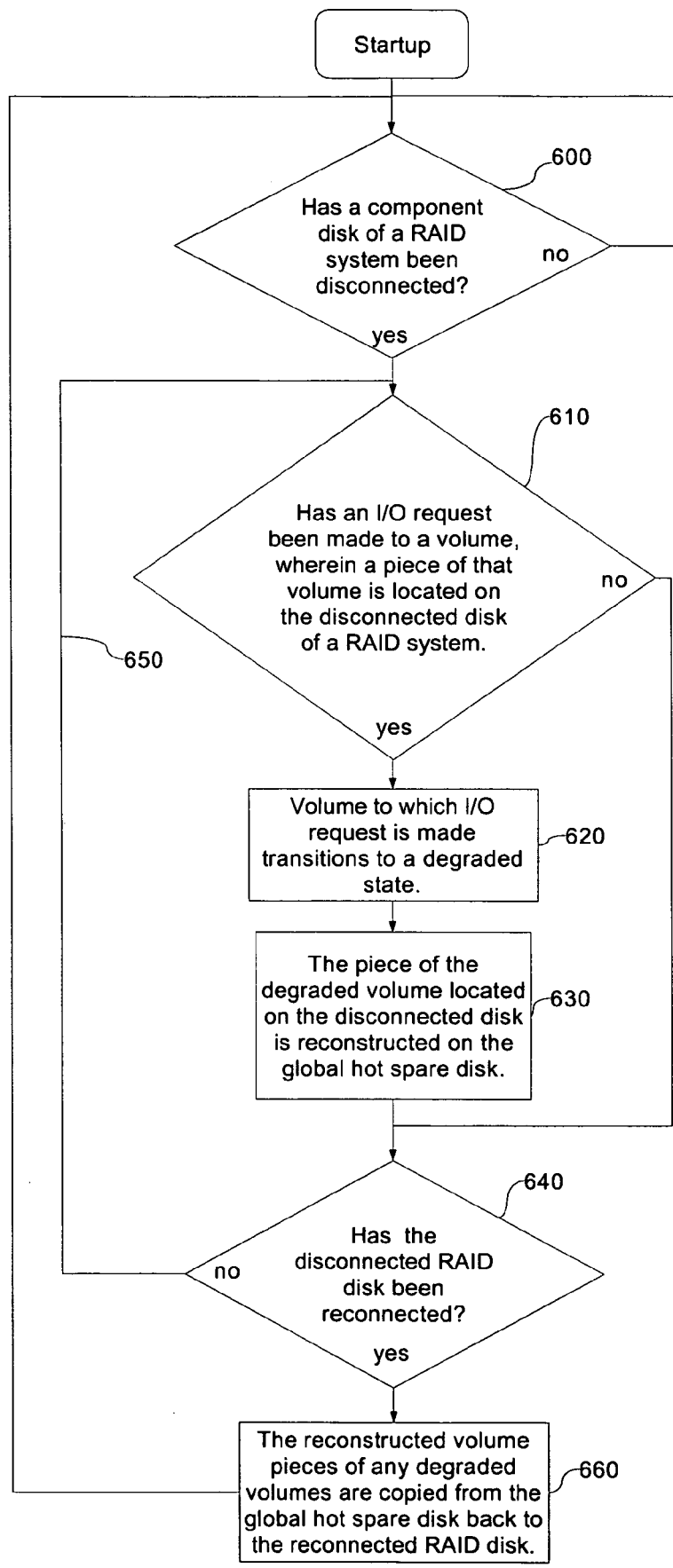
FIG. 6 is a flow diagram illustrating a method for the reconstruction and copyback of a disconnected disk in a RAID system utilizing a global hot spare disk.

Referring to FIG. 6, a flowchart detailing a method for the reconstruction and copyback of a disconnected disk in a RAID system utilizing a global hot spare disk is shown. Once the disconnection of a RAID disk has been detected 600, a stand-by global hot spare drive may be incorporated to account for the missing RAID disk. Should an external device capable of transmitting I/O requests, such as a CPU, issue an I/O request to the RAID system where a volume having a volume piece located on the disconnected disk is addressed 610, the volume to which the request is addressed transitions to a degraded state 620. Such a transition initiates the reconstruction of the volume piece of the degraded volume located on the disconnected disk 630. Following reconstruction, the system determines whether the disconnected disk has been reconnected 640. If the disconnected RAID disk is not reconnected following the reconstruction, the global hot spare disk continues to operate in place of the disconnected disk with respect to the degraded volume. The process may be repeated 650 if another volume should become degraded prior to reconnection of the disconnected RAID disk. Upon reconnection of the disconnected RAID disk, the reconstructed pieces of any degraded volume are copied back to the reconnected RAID disk 660.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for reconstructing the contents of a disconnected disk in an n-disk redundant array of inexpensive disks (RAID), the method comprising:
   detecting a disconnected disk in an n-disk RAID;
   receiving one or more input/output (IO) requests addressed to one or more logical volume pieces of the disconnected disk;
   reconstructing only the one or more logical volume pieces of the disconnected disk that are addressed by the one or more IO requests to a global hot spare;
   detecting a reconnection of the disconnected disk; and
   copying one or more reconstructed logical volume pieces of the disconnected disk from the global hot spare to the reconnected disk.

2. A computer-readable medium having computer readable instructions stored thereon for execution by a processor to perform a method, the method comprising:
   detecting a disconnected disk in an n-disk RAID;
   receiving one or more input/output (IO) requests addressed to one or more logical volume pieces of the disconnected disk;
   reconstructing only the one or more logical volume pieces of the disconnected disk that are addressed by the one or more IO requests to a global hot spare;
   detecting a reconnection of the disconnected disk; and
   copying one or more reconstructed logical volume pieces of the disconnected disk from the global hot spare to the reconnected disk.

3. A system for reconstructing the contents of a disconnected disk in an n-disk redundant array of inexpensive disks (RAID), the system comprising:
   circuitry for detecting a disconnected disk in an n-disk RAID;
   circuitry for receiving one or more input/output (IO) requests addressed to one or more logical volume pieces of the disconnected disk;
   circuitry for reconstructing only the one or more logical volume pieces of the disconnected disk that are addressed by the one or more IO requests to a global hot spare;
   circuitry for detecting a reconnection of the disconnected disk; and
   circuitry for copying one or more reconstructed logical volume pieces of the disconnected disk from the global hot spare to the reconnected disk.

4. The system of claim 1, wherein the detecting a reconnection of the disconnected disk further comprises:
   detecting a reconnection of the original disconnected disk.

5. The method of claim 1, wherein the detecting a reconnection of the disconnected disk further comprises:
   detecting a reinsertion of the disconnected disk.

6. The computer-readable medium of claim 2, wherein the detecting a reconnection of the disconnected disk further comprises:
   detecting a reconnection of the original disconnected disk.

7. The computer-readable medium of claim 2, wherein the detecting a reconnection of the disconnected disk further comprises:
   detecting a reinsertion of the disconnected disk.

8. The system of claim 3, wherein the means for detecting a reconnection of the disconnected disk further comprises:
   detecting a reconnection of the original disconnected disk.

9. The system of claim 3, wherein the means for detecting a reconnection of the disconnected disk further comprises:
   detecting a reinsertion of the disconnected disk.

* * * * *